May 26, 1953 H. COHEN ET AL 2,639,581
APPARATUS FOR BURNING FUEL IN HIGH VELOCITY GAS STREAMS
Filed Nov. 26, 1945 2 Sheets-Sheet 1

Inventors
Henry Cohen
John Henry Hamilton Darth
by Stevens and Davis
their attys Patented May 26, 1953

2,639,581

UNITED STATES PATENT OFFICE 2,639,581

APPARATUS FOR BURNING FUEL IN A HIGH VELOCITY GAS STREAM

Henry Cohen and John Henry Hamilton Darth, Farnborough, England, assignors to Power Jets (Research & Development) Limited, London, England Application November 26, 1945, Serial No. 630,950
In Great Britain September 14, 1944

18 Claims. (Cl. 60—35.6)

This invention is concerned with the burning of liquid fuel in high speed gas streams, for example in jet propulsion or like installations, and its broad object is to raise the energy level of such streams by providing means whereby ignition, and subsequent sustained combustion, is afforded in gas streams the velocity of which is of a high order, and especially in applications wherein the velocity or the rate of mass flow of the gas stream, and the required rate of burning, may both be considerably variable.

In more particular form, the invention is applicable although not exclusively, to a gas turbine jet propulsion system of the kind wherein the air delivery of a compressor is injected with fuel and brought to combustion, the hot gases of combustion driving a turbine which itself drives the compressor and being subsequently ejected through an exhaust duct to atmosphere to form a propulsive jet stream.

The invention provides means for burning liquid-fuel in the said exhaust duct so as to augment the total thrust obtained, though it will be clear from the following statements that it is applicable to the burning of fuel in a stream of air leaving, for example, a ducted fan, or by way of inter-stage re-heating in a turbine engine power plant.

In the particular case of thrust-augmentation, the operational conditions may be such that the rate of burning required varies over a wide range (e. g. with altitude) and also in that the re-heating fuel supply may be rapidly varied, for example rapidly throttled down, and it is one of the requirements that in this event the flame is nevertheless maintained. The invention affords means which meet these and other practical requirements.

In practical form the means for burning liquid fuel in a high speed gas stream comprise an injection device in the form of a symmetrical series of fuel jets, arranged to project fuel across the gas stream, and means located in the region of the injection device to sustain combustion in that region, despite the gas stream the tendency of which is to blow the flame out. The injection and sustaining means are located in the gas stream approximately equidistantly from the pipe or duct walls which confine the stream, i. e. in a circular-sectioned pipe the injector means is arranged as a symmetrical system around (and not far distant from) the axis of the pipe.

The nature, other objects and further features of the invention will be more apparent from the description given hereinunder by way of example relative to various forms of embodiment of the invention and with reference to the accompanying drawings in which.

Figure 1:
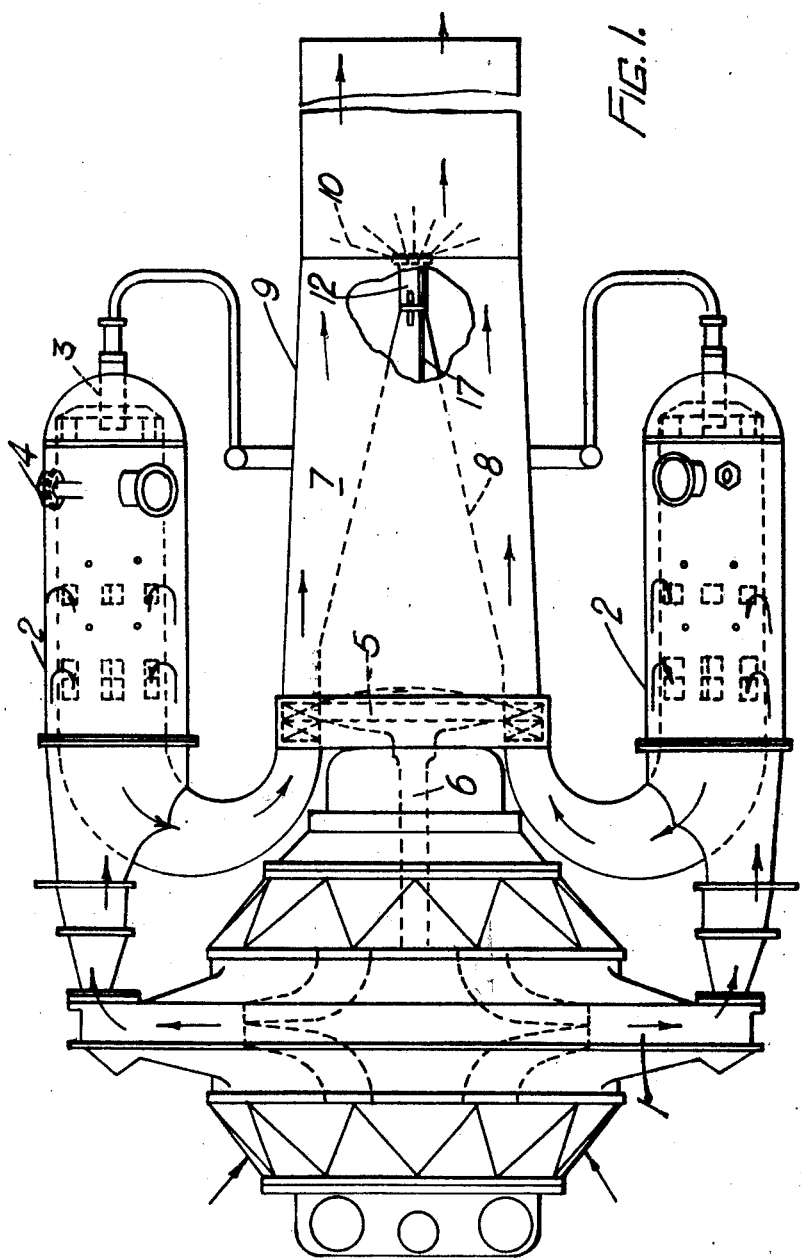
Fig. 1 is a general view of a gas turbine engine to which the invention may be applied.

Referring to Fig. 1, a compressor 1 delivers air to combustion chambers 2 into which fuel is injected through burners 3 and ignited by a spark plug 4. The hot gases then pass through a turbine 5 thus driving it, the said turbine itself driving the compressor 1 which is mounted on the same shaft 6, and the hot gases are finally ejected to atmosphere through an exhaust duct 7 formed between a conical fairing 8 and a jet pipe 9, thus forming a propulsive jet stream.

In order to raise the energy level of said exhaust stream, the hot gases are further energised in the exhaust duct 7 by injecting additional fuel (termed herein "reheat" fuel) in the form of jets 10 and sustaining the additional combustion by suitable combustion sustaining means denoted generally by 12 and described in detail with reference to Figures 2 and 3.

Figure 2:
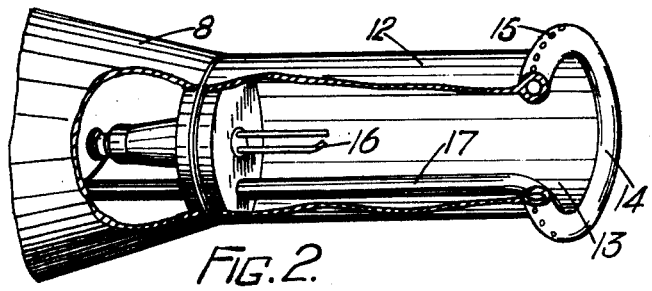
Fig. 2 is a sectional view of one form of embodiment.

In Fig. 2 the combustion sustaining means shown on an enlarged scale comprises a cylindrical pot 12 provided on the trucated apex of the fairing 8 and having an end 13 open downstream. Around the edge of this end 13 is a fuel pipe ring 14 with jet holes 15 pierced in it to spray fuel radially outward into the main gas stream. Within the pot 12 is an electric spark or hot-wire igniter 16. A pot with axial length of for example two and a half times its diameter, works satisfactorily. The fuel is fed to the ring 14 by a pipe 17 which is led through the fairing 8 and through the supporting structure thereof. When the fuel is supplied under pressure it sprays out from the ring 14 and the presence and form of the pot 12 produces such turbulence as to carry some of the fuel back into the said pot, where it ignites and the flame spreads through the gas stream in the region (preferably not extending right out to the exhaust duct wall 9) in which the fuel penetrates. A pocket of flame persists in the pot 12, and is found to sustain combustion as required.

Figure 3:
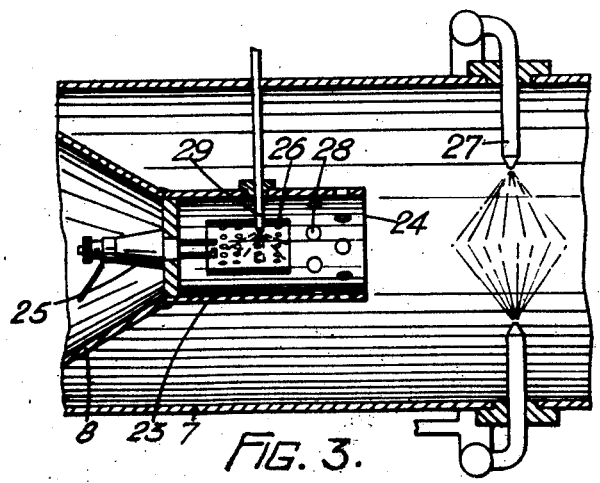
Fig. 3 is a sectional view of a second form of embodiment.

In a second form of embodiment shown in Fig. 3, a small pilot combustion chamber 23 is fitted axially in the exhaust duct 7 with its open end 24 directed rearwardly or in the direction of flow of the gas stream. The forward closed end of the chamber 23 is fitted with a spark plug 25 which may be surrounded by a perforated shield 26 and a pilot fuel jet 29 is fitted in the chamber 23 a short distance to the rear of the plug 25, whilst the end 24 of said chamber, which may be perforated with holes 28 extends to a short distance upstream of a ring of main fuel burner nozzles 27 the fuel jets or sprays from which converge at a point a short distance beyond the chamber 23.

In operation, fuel injected into the chamber 23 by the jet 29 vaporizes in said chamber and is initially ignited by the spark plug 25. A steady pilot flame then burns from the rear end 24 of the chamber 23 which chamber acts as a shield for the pilot jet 29. The fuel injected by the main burner nozzles 27 converges upon the pilot flame whereby it is ignited and maintained alight, so that combustion is completed in a short length and there is little appearance, if any, of a flame at the rear end of the jet pipe 9. Since the pilot flame issues from the rear end of the chamber 23 and does not envelope the pilot jet 29, the latter does not become choked with carbon due to cracking of the fuel in the fine bore pipe 29. In many cases efficient thrust augmentation calls for simultaneous variations of reheat fuel supply and of nozzle area.

We claim:

1. In an exhaust system for a gas turbine including a turbine wheel and an outer duct having an inner core of generally conical form constituting a fairing from said wheel, said core defining with said duct an annular passageway of progressively increasing area in the downstream direction, the improvement which comprises a stabilizing shield attached at the downstream end of said core, said shield functioning to cause reverse flow and turbulence in the stream emerging from said passageway to produce a stabilized flame zone but occupying a relatively small part of the duct cross section such that the turbulence created thereby is only local and does not substantially modify the conditions of flow in the stream as a whole and means for introducing fuel into said zone and for injecting fuel into a free and unobstructed region of the stream emerging from said passageway.

2. A combustion system for burning fuel in a high velocity gas stream comprising a duct carrying said stream, wall means within said duct defining a chamber having a closed upstream end and an open downstream end, said chamber defining a flame stabilizing zone, an igniter within said chamber, means for introducing fuel into said zone and further means for introducing fuel into the free stream downstream said zone.

3. A combustion system according to claim 2 wherein said further means comprises a plurality of fuel injectors adapted to direct a plurality of convergent jets towards a point downstream of said zone.

4. A combustion system according to claim 3 wherein said injectors are directed transversely of the gas stream.

5. A combustion system according to claim 2 wherein the wall of the chamber is perforated.

6. A combustion system for burning fuel in a high velocity gas stream comprising a duct for carrying said stream, a stabilizing shield within said duct for causing reverse flow and turbulence in said stream to provide a stabilized flame zone, said shield occupying a relatively small part of the duct cross section such that the turbulence created thereby is only local and does not substantially modify the conditions of flow in the stream as a whole, means for injecting fuel directly into said stabilized flame zone and separate means for injecting fuel into a free and unobstructed region of said stream downstream of said zone.

7. Combustion system according to claim 2 further comprising a perforated shield surrounding the ignitor device.

8. A combustion system for burning fuel in a high velocity gas stream comprising a duct for carrying said stream, a stabilizing shield within said duct to cause reverse flow and turbulence in said stream to provide a stabilized flame zone, said shield occupying a relatively small part of the duct cross-section whereby the turbulence created thereby is only local and does not substantially modify the conditions of flow in the stream as a whole, and a plurality of fuel burners arranged symmetrically within the duct and adapted to discharge jets of fuel transversely of the gas stream with wide radical and circumferential distribution directly into the free and unobstructed regions in said stream, said burners being located with such special relationship to said stabilizing shield that at least some of the fuel injected into the stream is carried into the stabilized zone to burn and form a stable flame therein.

9. A combustion system for burning fuel in a high velocity gas stream comprising a duct for carrying said stream, wall means within said duct defining a chamber having a closed upstream end and an open downstream end to cause reverse flow and turbulence to provide a stabilized flame zone, said chamber occupying a relatively small portion of the duct cross-section whereby the turbulence created thereby is only local and does not substantially modify the conditions of flow in the stream as a whole, an igniter with said chamber, and a plurality of fuel burners for positively injecting fuel with wide radial and circumferential distribution directly into free and unobstructed regions in said stream and transversely thereof, said burner being located in the region of the open end of said chamber whereby at least some of the fuel injected into the stream is carried into the stabilized zone to burn and form a stable flame therein.

10. A combustion apparatus for burning fuel in a high velocity gas stream comprising a duct for carrying said stream, wall means within said duct defining a chamber having a closed upstream end and an open downstream end, said chamber defining a stabilized flame zone and means for introducing fuel into said zone and into a free and unobstructed region of the stream.

11. An exhaust system for a gas turbine including a turbine wheel and an exhaust duct extending downstream therefrom, a conical fairing tapering in the downstream direction coaxially located within the duct downstream of the turbine, a stabilizing shield attached to the downstream end of said core, said shield defining a stabilized flame zone, and means for introducing fuel into said zone and into a free and unobstructed region of the stream.

12. A combustion system for burning fuel in a high velocity gas stream comprising a duct carrying said stream, wall means within said duct defining a chamber having a closed upstream end and an open downstream end, said chamber defining a flame stabilizing zone, an igniter within said chamber, and a plurality of fuel injectors symmetrically spaced around the open end of said chamber and directed to inject fuel radially outwardly and transversely of the stream.

13. A combustion system according to claim 12 comprising a pipe forming a ring around the opening of said chamber, said injectors being symmetrically disposed around the ring.

14. A combustion system for burning fuel in a high velocity gas stream comprising a duct for carrying said stream, an elongated axially extending generally cylindrical flame stabilising shield within said duct, closed at its upstream end and at least a substantial upstream portion of the cylindrical shield being imperforate, and open at its downstream end causing reversed flow and turbulence in said stream to provide a stabilized flame zone, and means for introducing fuel into said zone and for injecting fuel into a region of the stream outside of and adjacent said zone.

15. A combustion system according to claim 14 further comprising an igniter within said stabilized flame zone.

16. A combustion system for burning fuel in a high velocity gas stream comprising a duct for carrying said stream, an elongated axially extending generally cylindrical stabilising shield within said duct closed at its upstream end and at least a substantial upstream portion of the cylindrical shield being imperforate and open at its downstream end causing reversed flow and turbulence in said stream to provide a stabilised flame zone, a fuel injector within said zone, and a further fuel injector outside and adjacent said zone.

17. A combustion system according to claim 16 wherein said further injector is aligned with said zone.

18. A combustion system according to claim 16 wherein said further injector is aligned with said zone and is spaced downstream from said zone.

HENRY COHEN.
JOHN HENRY HAMILTON DARTH.

References Cited in the file of this patent

UNITED STATES PATENTS

| Number | Name | Date |
|---|---|---|
| 1,283,109 | Doble | Oct. 29, 1918 |
| 2,280,835 | Lysholm | Apr. 28, 1942 |
| 2,332,866 | Müller | Oct. 26, 1943 |
| 2,371,889 | Hermitte | Mar. 29, 1945 |
| 2,385,833 | Nahigyan | Oct. 2, 1945 |
| 2,395,919 | Sundell | Mar. 5, 1946 |
| 2,402,377 | Davenport | June 18, 1946 |
| 2,404,334 | Whittle | July 16, 1946 |
| 2,409,176 | Allen | Oct. 15, 1946 |
| 2,529,506 | Lloyd et al. | Nov. 14, 1950 |